Figure 1:
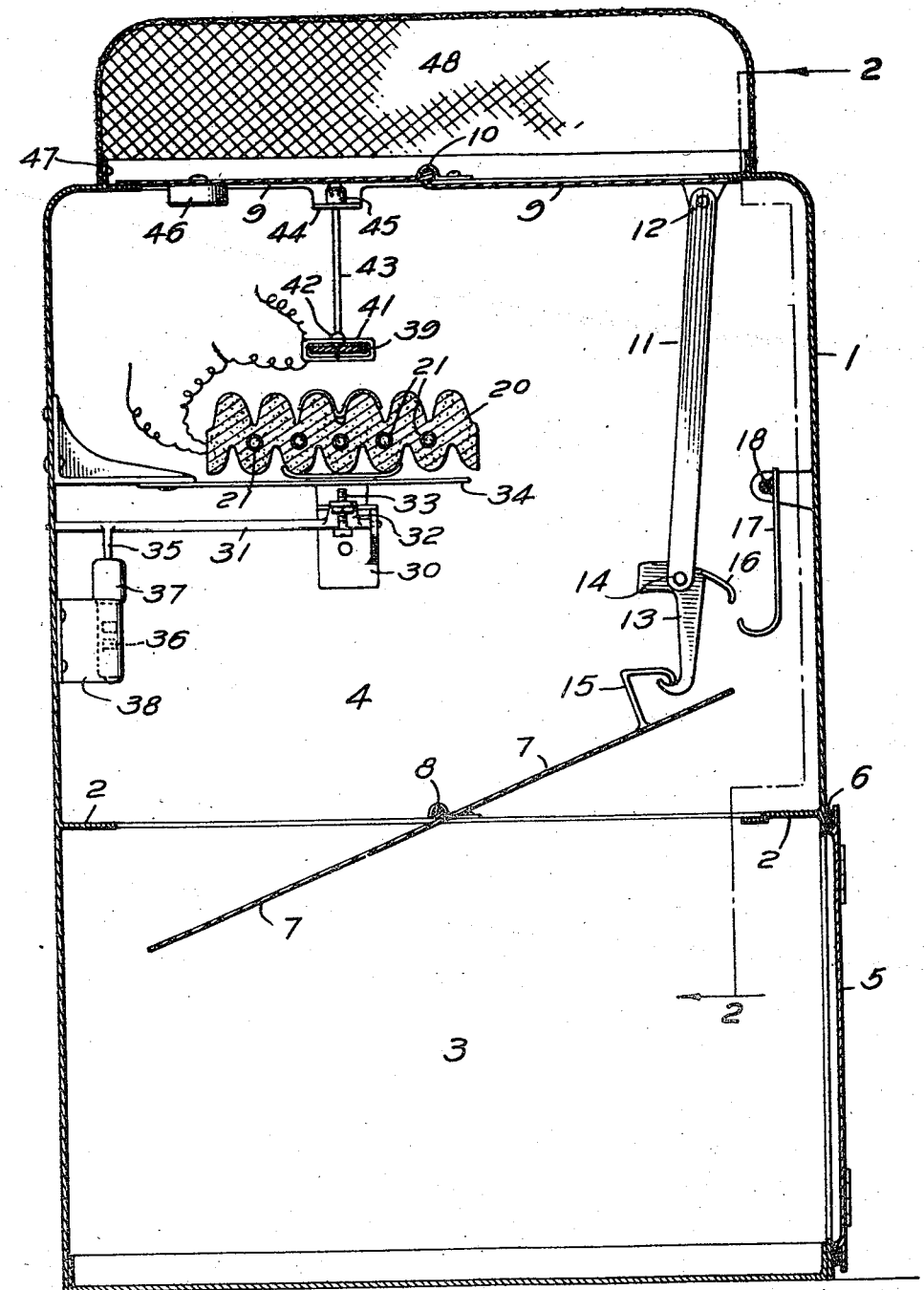

Nov. 12, 1946.  R. V. HEUSER  2,411,039
DRYING APPARATUS WITH AIR DESICCATING MEANS
AND AUTOMATIC REGENERATING MEANS THEREFOR
Filed Oct. 12, 1943  4 Sheets-Sheet 1

INVENTOR
RALPH V. HEUSER.
BY
ATTORNEY

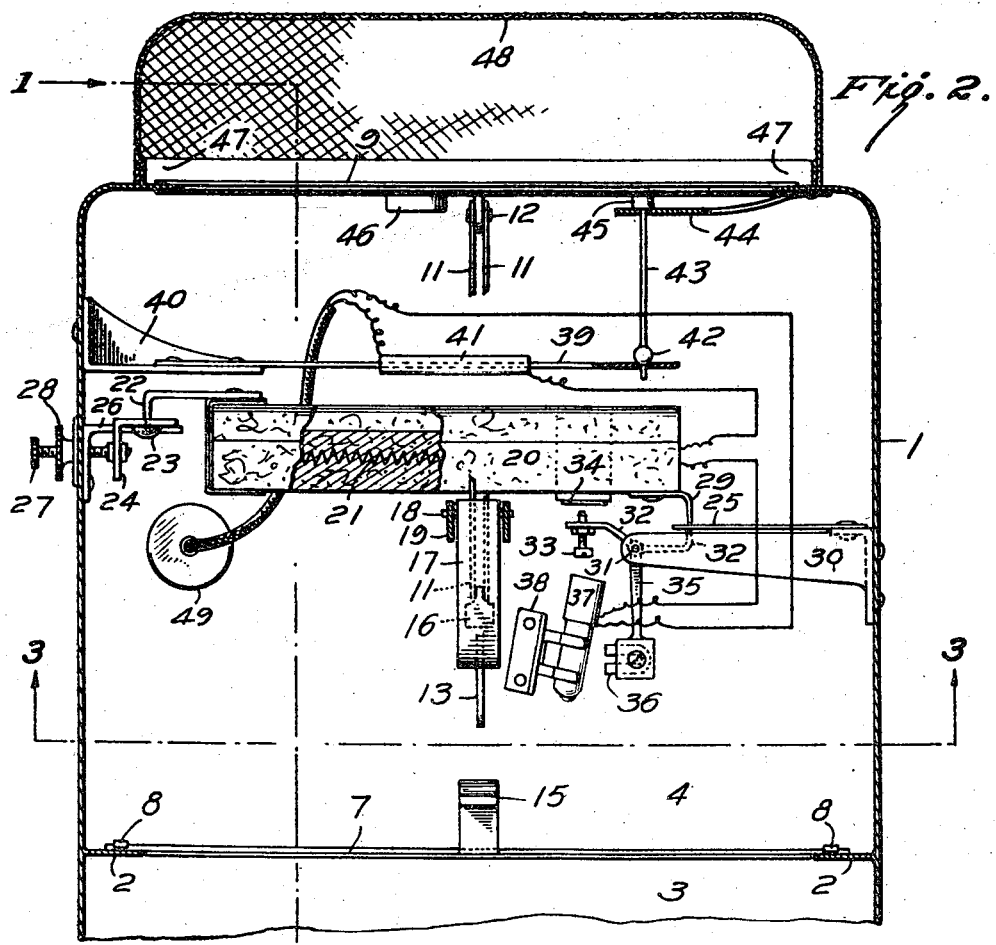
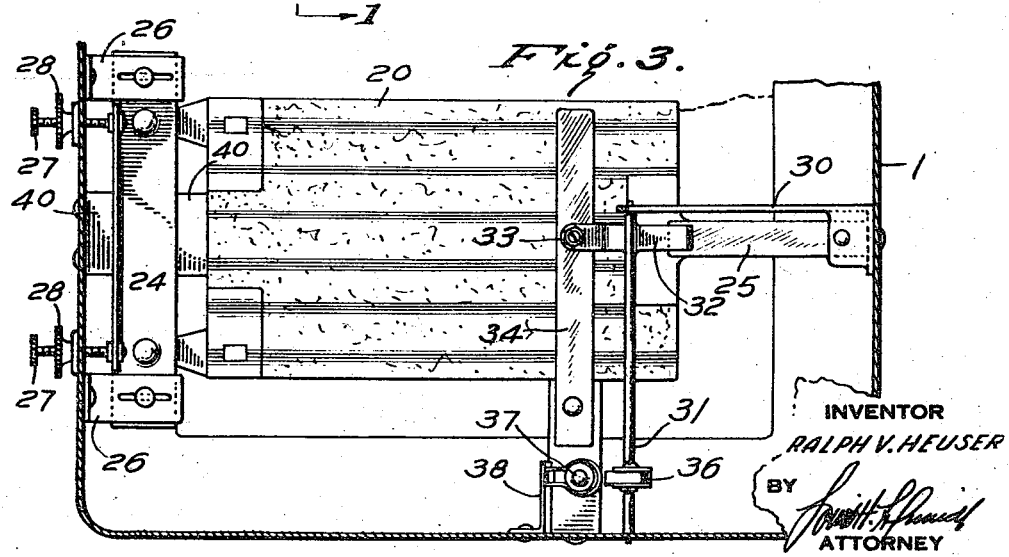

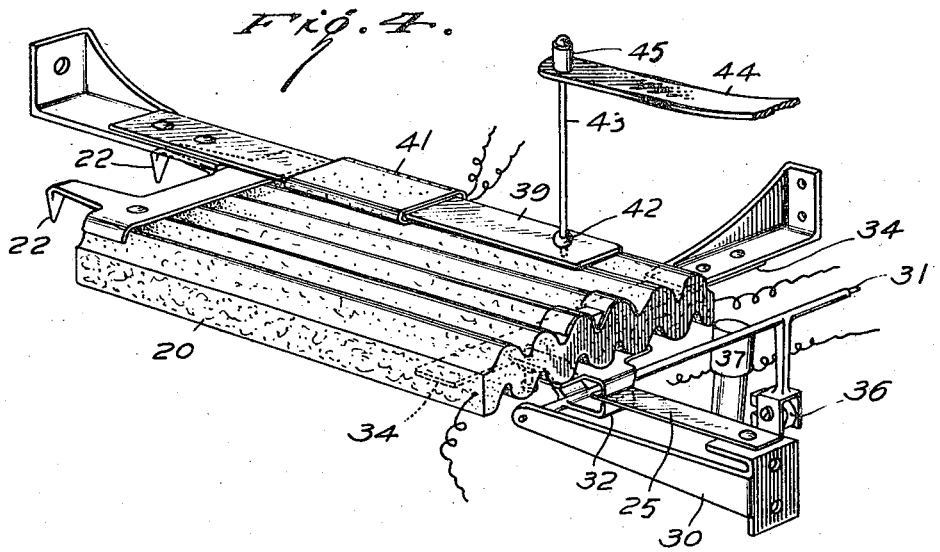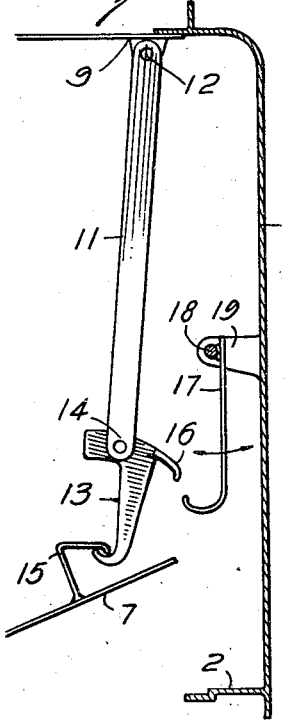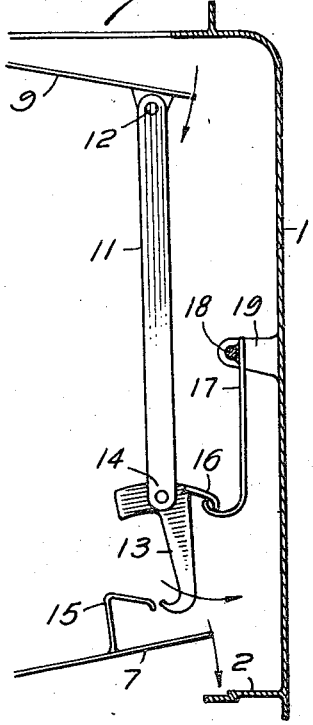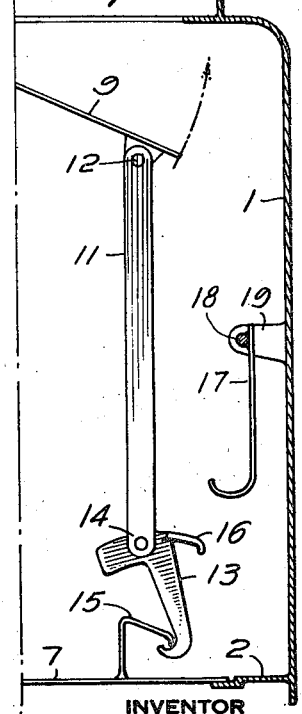
INVENTOR
RALPH V. HEUSER,
BY
ATTORNEY

Nov. 12, 1946. R. V. HEUSER 2,411,039
DRYING APPARATUS WITH AIR DESICCATING MEANS
AND AUTOMATIC REGENERATING MEANS THEREFOR
Filed Oct. 12, 1943 4 Sheets-Sheet 4
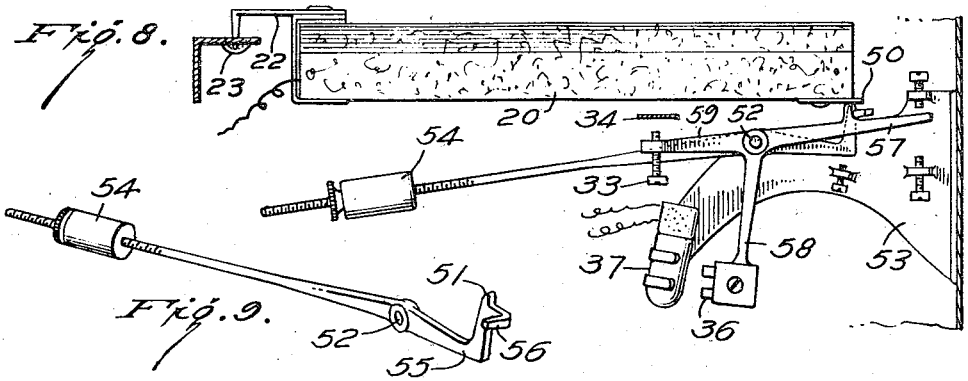
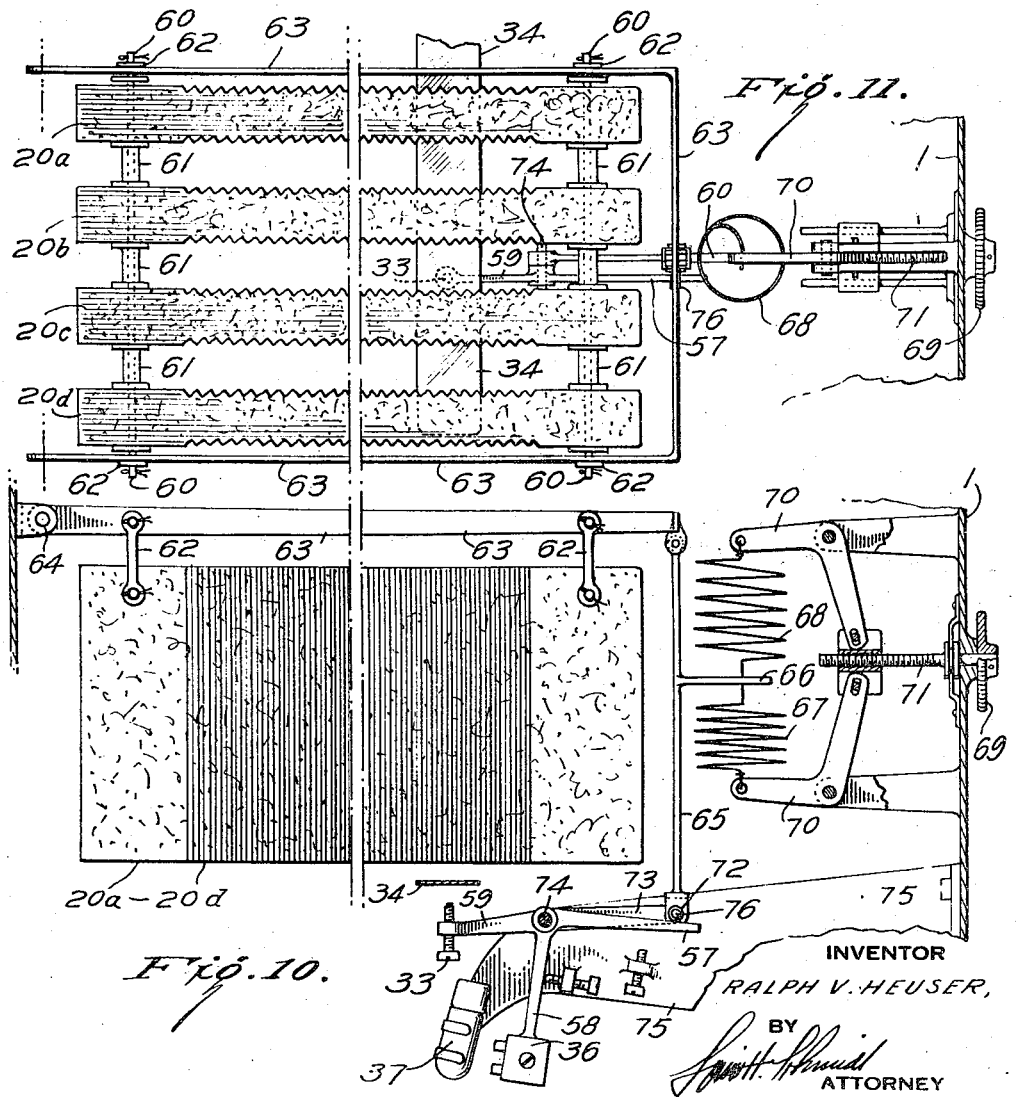
INVENTOR
RALPH V. HEUSER,
BY
ATTORNEY Patented Nov. 12, 1946

2,411,039

UNITED STATES PATENT OFFICE 2,411,039

DRYING APPARATUS WITH AIR DESICCATING MEANS AND AUTOMATIC REGENERATING MEANS THEREFOR

Ralph V. Heuser, Weaverville, N. C.

Application October 12, 1943, Serial No. 505,931

4 Claims. (Cl. 34—50)

The present invention relates to apparatus for drying and desiccating materials with the aid of porous compositions capable of being desorbed or activated by heat.

The invention will probably be of greatest utility in homes, laboratories, hospitals, restaurants and certain stores or work shops where an actual or potential need exists for a compact, self-contained drying device permitting small objects to be rapidly dried and maintained at a low degree of relative humidity.

In homes the apparatus will be useful for storing and preserving various food products such as crackers, cookies, cereals, etc., once their container has been opened, in a crisp and fresh condition, hence preventing the same from becoming soggy and unpalatable. It will also prevent the caking of powdered and granulated products such as sugar, flour, salt and spices. Furthermore it will overcome certain difficulties connected with the dehydration of vegetables in ovens by the hot-air drying process. Some of the dried vegetables are very hygroscopic, hence in order to prevent them from reabsorbing moisture and become infected and deteriorated by molds, spores or pathogenic micro-organisms it has been the practice to put the dried products in hermetically sealed containers. By use of the present drying apparatus this inconvenience and expense can be avoided.

In laboratories the automatic drying apparatus would supplant or supplement conventional desiccators usually charged with sticky, deliquescent or corrosive chemicals for absorbing water vapor. The trouble and expense of replacing such chemicals would be eliminated. Besides a more rapid drying would be had as compared with desiccators operating at maximum efficiency only when freshly charged.

In hospitals and first-aid stations the apparatus would be advantageous for storing and maintaining sterilized dressings, sutures, bandages as well as surgical instruments, Petri dishes, etc., in an aseptic condition after sterilization, since very dry hair has a strongly inhibitory effect on the growth and propagation of bacteria and other dangerous organisms.

The few aforementioned uses are merely illustrative of numerous applications in which an inexpensive, reliable drying apparatus is needed. One of the principal objects of the invention is, therefore, to provide an inexpensive, reliable and efficient apparatus for drying and desiccating materials in the above mentioned relationships. Other objects of the invention will be apparent from the following description thereof.

The present drying apparatus is simple in design, noiseless in operation and does not give rise to radio disturbances. It has no moving elements subject to wear nor intricate parts likely to get out of order. Furthermore it does not require to be lubricated and it operates without any attention. It is an improvement over the drying device described in my U. S. Patent 2,067,920 which is non-automatic in operation and requires a person's attention in several manipulations.

The present invention is based in part on the following principle: Bodies of adsorbent composition, preferably in the form of a molded plate (or a multiplicity of plates), take up the moisture liberated from the materials to be dried. The resultant gain in weight by the plate is instrumental in causing an electric circuit to be closed by a sensitive electric switch, the ensuing electric current passing through a system of resistance wires embedded within the plate or in close proximity thereof for purposes of removing the adsorbed water from the plate. When this is the case a bimetallic strip opens the electric switch, the plate cools down and is again in condition to adsorb moisture. The plate fulfills, therefore, the dual role of functioning as an adsorbing medium and as an organ of the control mechanism of which it forms a part. This mechanism is produced in the form of a balance, the plate being counterpoised by a movable weight, by a cantilever spring or by a helical spring.

From the above it is seen that the apparatus works in a cyclic manner. The onset of the desorbing phase is made adjustable by changing the moment created by the counterpoise. This is done by changing either the distance of the weight from the fulcrum, or by changing the leverage of the cantilever spring or the stiffness of the helical spring. Furthermore provision is also made for regulating the period during which the electric current is caused to flow through the heating system.

The invention will be more readily understood by reference to the accompanying drawings, in which like reference characters indicate like parts. In these drawings Fig. 1 is a vertical cross sectional view taken along the line 1—1 of Fig. 2, Fig. 2 is a vertical transverse section taken along the line 2—2 of Fig. 1, Fig. 3 is a cross sectional underside view taken along the line 3—3 of Fig. 2, Fig. 4 is a perspective view of the plate and accessory parts shown in Fig. 1, 2, 3, Fig. 5, Fig. 6 and Fig. 7 depict three positions of the link mechanism at different stages of the drying operation, Fig. 8 is a longitudinal view of an adsorbant plate with gravitational control mechanism, Fig. 9 is a perspective view of the lever shown in Fig. 8, Fig. 10 is a front elevation and Fig. 11 a plan view of four depending plates coupled together and a control mechanism based on the use of a helical spring.

The apparatus according to this invention consists essentially, as shown in Fig. 1 of a container 1 subdivided into two compartments 3 and 4 by a horizontal partition 2. The lower compartment 3 serves as a receptacle for the materials to be dried, and these may be introduced and withdrawn through a hinged door 5, around the rim of which is fitted a resilient gasket 6. Door 5 also is provided with a bolt and latch (not shown in the drawing) permitting the door to be closed tightly. Partition 2 is designed as a narrow shelf within the container 1 to accommodate a two-winged door 7 capable of being tilted about pivots 8 in one direction only, as clearly indicated in the drawings. The top of the container 1 is provided with a similar door 9 which, for the sake of brevity will hereinafter be designated as "upper door" as distinguished from door 7 hereinafter referred to as "lower door". Upper door 9 is tiltable on pivots 10 but only in the direction opposite to that of the lower door 7. These two doors are suitably linked together in such manner that when one is open to the fullest extent possible the other is closed tight and vice-versa.

In order to prevent moisture liberated from the plate during the desorption phase from passing into the lower compartment 3 provision is made for the sudden closing of the lower door 7 as soon as the upper door 9 has begun to open by the action of a mechanism which will be described later. The tilting movement of the lower door 7 is made dependent upon the movement of the upper door 9 through the intermediary of a link 11 and a pawl 13. The link 11 consists of two narrow strips of metal, and it is fastened to the underside of the upper door 9 and 12 in a free-swinging manner. The pawl 13 is suspended from the lower extremity of link 11 and it swings freely on pivot 14. At certain periods of the cycle the pawl 13 engages the latch 15 which is rigidly attached to the upperside of the lower door 7. At another stage of the operation pawl 13 will be seized through the intermediary of the projecting finger by a hook 17 supported in a free-swinging manner at point 18 of the bracket 19.

During the absorbing stage of the plate the upper door 9 is closed and the lower door 7 remains open whereby the air is enabled to circulate freely between the two compartments 3 and 4, as illustrated in Fig. 5. When subsequently the upper door begins to open, as shown in Fig. 6, the finger 16 has been seized by the hook 17 thereby causing the curved end of pawl 13 to free itself from latch 15 and causing the lower door 7 to suddenly fall shut in which position it then resides during the entire desorption stage of the plate. As the upper door 9 opens wider at this time link 11 and pawl 13 will descend lower, finally slipping over the top of latch 15 and re-engaging it on its underside, so that when the upper door begins to close it will carry with it the lower door 7 and open it gradually. During its upward travel the finger 16 of pawl 13 will clear the hook 17 by pushing it slightly toward the wall of the container. The hook 17 is then again in position to trip the pawl 13 when the subsequent opening of the upper door 9 occurs.

The compartment 4 also houses the adsorbent plate 20 in the interior of which is embedded a stretched coil of electric resistance wire 21. At one end of its length plate 20 is supported on two prongs 22, Fig. 2, by small cups 23 of glass or metal. While the prongs 22 are free to move in said cups 23, yet the prongs also hold the plate 20 in a fixed position and thus insure the partial weight of the plate to exert its action on the spring 25 always at the same point once the proper adjustment has meen made. For this purpose the cups 23 secured to angle 24 can be moved in the axis of the plate towards or away from the flat spring 25, by causing the angle 24 to slide on brackets 26 in and out upon turning the screws 27 which are provided with locknuts 28. The plate is supported at the opposite end of its length by the blade 25, of suitable resiliency, via a curved metal strip 29 secured centrally to the underside of plate 20. The spring 25 is attached at its other end to a base fixed on the wall 1, of the container. On the said base is also fastened the bracket 30. When the spring blade 25 is mounted on the base it has sufficient upward tilt that it will assume a substantially horizontal position upon being weighted down by the plate 20 after installation of the same. The distance of the center of the plate 20 from cups 23 advantageously is greater than the distance to where the strip 29 touches the spring 25.

As shown in Fig. 2, the bracket 30 supports one end of a light shafting 31 on which is secured bell crank 32. One arm of bell crank 32 touches the underside of blade 25 while the other arm bears a setscrew 33, positioned opposite a bimetallic strip 34. To shaft 31 is also rigidly secured an arm 35 bearing a small permanent horse-shoe magnet 36. The slight downward deflection of the spring 25 (brought about by moisture adsorption of plate 20) causes the magnet to approach the iron armature inside a Mercoid switch 37, mounted on the angle 38.

Another, somewhat sturdier bimetallic strip 39, fastened to bracket 40, surmounts the plate 20 in a longitudinal direction. In its middle section strip 30 bears a heating element 41 consisting of 6 to 10 turns of resistance wire wound around a thin asbestos bobbin, the wiring also being insulated by asbestos or glass fiber fabric on the outside in such a manner as not to interfere with the curling motion of the bimetallic strip under the influence of heat from the two sources. Through a perforation near the free end of the strip 39 a metal rod 43 projects a short distance while its club shaped enlargement 42 rests on top of the strip. The other end of rod 43 passes through a gide 44 and at the extreme end of rod 43 a cup 45 is attached which holds a polished steel ball. The latter bears against a wing of the upper door 9, causing the latter to be opened when the electric current passes through the element 41 and the plate 20. A counter-weight 46, fastened to the inside of one of the wings of door 9, serves as a means to insure the spontaneous closing of the door 9, when the rod 43 retreats to its normal position related to the adsorbing stage of plate 20. Counter-weight 46 is fixed on the wing opposite to that which carries the link 11 and pawl 13. A rim 47 surrounding the top of container 1 serves as a means to position a detachable hood 48 preferably made of perforated metal so as to allow moisture-laden air readily to escape into the open when the door 9 has opened. The electric current enters the apparatus through socket 49, the circuit wiring being diagrammatically indicated in Fig. 2.

As shown in Fig. 8, which illustrates another embodiment of the present invention as it concerns a modified form of the control mechanism, the same manner of positioning the plate 20 by prongs 22 and cups 23 is employed as in the previously described design, illustrated in Fig. 2, Fig. 3 and Fig. 4. In the present instance, however, a metal disc 50 secured to the underside of plate 20 rests on the tip 51 of an upwardly curved lever arm 55 (Fig. 9). A pin 52 secured to a bracket 53 furnishes the fulcrum for the lever. The other arm of the lever bears a sliding weight 54 to oppose the force exerted by the weight of the plate on the point 51 of the short lever arm. The pin 52 supports also in a free-rocking manner a spider with arms 57, 58 and 59. (Said spider is shown in the drawing in front of the lever.) An offset-finger 56 of the short lever arm projects over the top of arm 57 and causes the latter to be turned downward when the weight of plate 20 increases due to moisture adsorption. In consequence of this the small horse-shoe magnet 36 attached to the arm 58 of the spider will approach the mercury switch 37, secured to bracket 53, until the magnetic attraction of the soft iron armature inside the switch 37 is sufficiently strong to seize and hold the magnet. The heat radiated from the underside of the plate 20 upon the bimetallic strip 34 causes the latter to curve downward until it touches the setscrew on the arm 59 and turns the spider backward so that the magnet 36 becomes detached from the switch 37 which interrupts the electric current. At this juncture the lever as well as the spider are again at their original position.

The drawings Fig. 10 and Fig. 11 illustrate a third embodiment of the present invention. Four vertically suspended adsorbent plates 20a, 20b, 20c and 20d, spacially separated, are rigidly linked together in any suitable manner, as for example by means of rods 60 and porcelain spacers 61. The projecting ends of the rods 60 are engaged by links 62 and by means of these secured to a U-shaped frame 63 pivoted in a free-swinging manner on the two pins 64. On the opposite side of the frame a rod 65 with attachment 66 is used to support the middle part of the frame by the intermediary of a helical spring on the pivots of two bell-crank levers 70. The helical spring consists of the two parts 67 and 68. By turning a knurled disc 69 on the outside of container I and therefore also by turning the threaded shaft 71 in one direction or other, the two springs 67 and 68 can be tightened or relaxed at will without disturbing the position of attachment 66 and other parts of the control mechanism.

When thus making the sensitivity to deformation of the helical spring adjustable by changing its stiffness (i. e. the tension under which it operates) it is obvious that a given weight increment acquired by the plate system 20a, 20b, 20c and 20d as a result of water adsorption, can be caused to either advance or retard the closing of the electric circuit and hence the onset of the adsorbing phase.

Rod 65 is steadied in its upright position by being linked at its lower end by a pin 72 to a lever 73 capable of swinging on pin 74 which is firmly secured to a bracket 75. A sleeve 76 on pin 72 projects over the top of the arm 57 of a spider pivoted on the pin 74. The arm 59 of the spider carries a setscrew facing the bimetallic strip 34 and the arm 58 supports a small horse-shoe magnet 36 actuating the switch 37 mounted on the bracket 75.

Needless to say a flat coil spring could also be used to operate under a tension, varied at will for purposes of regulating the performance of the apparatus. However the previously described use of the double helical spring simplifies the design and is, therefore, the preferred means to serve as an essential part of the construction of the drying apparatus according to the present invention.

When the apparatus is put in operation and the electric current is beginning to flow through the resistance wire in the plate and heating element 41, the bimetallic strip 39 will curl upward, thereby pushing the steel ball 45 on top of rod 43 against one wing of the upper door 9 and causing the latter to be opened gradually. The heating element 41 is used for the purpose to cause the upper door 9 to be opened more promptly than would be the case if the bimetallic strip 39 received only the heat supplied through radiation from plate 20, this radiation being very small at first. When door 9 has opened slightly the mechanism already previously described comes into play which causes the lower door 7 to fall shut suddenly. Soon afterward water vapor will be evolved from the plate in increasing volume as the plate gets hotter. However the heat required for the evaporation of the water tends to check a rapid rise of temperature of the plate until most of the water has evaporated when the temperature rises rapidly until finally the heat radiation upon the bimetallic strip 34 underneath the plate 20 becomes strong enough to deflect the strip 34 downward to a sufficient degree to withdraw the magnet 36 from the switch 37. During the desorbing phase which for a small-sized model of the apparatus generally lasts ten to fifteen minutes, the water vapor is rapidly carried away by air convection currents rising from the hot plate. The moist warm air travels upward along the underside of the partially opened door. The action of air as a diluent prevents the water vapor from condensing on the cold walls and other surfaces of the upper compartment. An effective air circulation is set up by the influx of cold air over the top of the downwardly inclined wing of door 9 into the interior. The inflow and outflow of the air is therefore in counter-current motion, and as a result of the rapid withdrawal of heat by the effluent vapor mixture the drying chamber 3 remains cool and the walls of the upper compartment 4 become only slightly warm.

When the electric current is automatically interrupted by the removal of the small horse-shoe magnet from the Mercoid switch 37 the air circulation is maintained for some time longer, while the plate 20 is cooling. Because of the fact that the return of the door 9 to its closed position proceeds in thermostatic relationship with the rate of cooling of the plate 20, obviously the door 9 can never be in its "closed" position so long as the plate is still warm. This is important inasmuch as this circumstance insures that the plate 20 recovers its adsorptive potency as rapidly as possible. The same conditions prevail when a plurality of plates is employed, as shown in Fig. 11, instead of a single plate.

Alternatively it is not necessary that the entire number of plates be used together in the balancing mechanism. Instead, only one plate, but of the same size as the others may function as a pilot plate for closing and opening the electric circuit while the other plates are mounted stationary and connected in series to the pilot plate. This arrangement will simplify the construction and provide a better utilization of the space in plate compartment 4.

The adsorbent plate 20 of the upper compartment 4 never requires to be reconditioned in ordinary service since any volatile substance beides water which may condense on its surface will always be expelled from the plate during its reactivation in the desorbing phase. This is borne out from trials with a model of the non-automatic type extending over several years when the plates had lost none of their initial drying power and capacity.

To be suitable for use in the present drying apparatus, the adsorbent plate must be highly porous in texture so as to enable the water vapor to readily penetrate to the interior of the plate. It also must be mechanically strong and durable and not develop cracks during the rapid removal of the water vapor in the heating operation. The particles composing the plate must be firmly bonded together to prevent any loss of material in continued operation and to make it possible to use the plate without any protective covering. Finally the plate should have a high capacity as well as a high intensity for adsorbing water vapor. These various requirements are fulfilled by molding the plate from a three-component mixture comprising a desiccating agent, a fibrous filler and a binding agent. In order to be able to use a larger proportion of the desiccating agent in the mixture than has been possible by using gypsum as a binding agent according to U. S. Patent 2,067,920, further experimentation led to the discovery that the mineral bentonite was extraordinarily suitable as a binding agent. Not only was it found possible to use this binder in appreciably smaller quantity, but its use in the composition greatly facilitated the kneading and molding of the moist mixture into a homogeneous, plastic mass from which surplus water could be easily removed by compression in a specially designed mold between liners of cloth or the like, and applying the pressure gradually with increased force. The good plasticity of the mass also made it possible to impress in it without any effort a previously wound and evenly-spaced resistance wire coil into one half of the plate before adding the remainder of the mass in such a manner as to preclude formation of air pockets and finally expressing the surplus water from the composite slab in the mold. On a manufacturing scale it would probably be most advantageous to produce the plates in half-thicknesses by extrusion. No claim is made, however, for any particular method in producing the molded plates with embedded resistance wires.

For experimental purposes plates of corrugated cross-section were made with the over-all dimensions 6" x 3" x 1", the thinnest part of the plate between the furrows being ½". They contained embedded Nichrome resistance wire coils wound on a $\frac{3}{32}$" mandril, 16 ft. of 30 B. & S. ga. "Chromel A" wire being used for operating on 110 volt. Satisfactory plates could be made from commercial silica gel as well as Activated Alumina. Typical mixtures were as follows:

|  | Parts |
|---|---|
| (A) Silica gel | 57 |
| Asbestos | 29 |
| Bentonite | 14 |
| (B) Activated Alumina | 70 |
| Asbestos | 20 |
| Bentonite | 10 |

The silica gel used was of minus 100 mesh particle size. The Activated Alumina was a minus 300 mesh powder. Each of the above mixtures was triturated and kneaded to a stiff dough with approximately 50 parts of water per 100 parts of the dry mixtures. The dough was then homogenized by passing through a shredder. In both compositions the asbestos used was a good grade of chrysolyte, size "5M20."

The field of application for the drying apparatus determines the choice of the desiccating agent to be used. Generally silica gel has a broader range of adsorptivity, but a smaller drying intensity than Activated Alumina. The latter also has the advantage of being effective at somewhat higher temperature, as for example in tropical countries. In certain applications where a particularly intense drying or desiccating action is required the use of soluble anhydride also comes into consideration, notwithstanding its comparatively high specific gravity and narrow range of effectiveness. In this case the drying action is due to a chemical binding of the water to form the hemi-hydrate of calcium sulfate, whereas in the case of the desiccants mentioned previously the water is held by capillary condensation in the pores of these substances

What is claimed as new and useful is:

1. A drying apparatus comprising the combination of a drying chamber adapted to receive materials to be dried and an adsorbing chamber, said chambers having a common wall, a movable door in the wall, a moisture adsorbing unit and a heating element therefor within the adsorbing chamber, means for movably supporting said adsorbing unit, and means actuated by said supporting means when a predetermined weight of moisture has been adsorbed by said unit to energize said heating element, a second door separating the adsorbing chamber from the outer atmosphere to permit vapors liberated from the adsorbing unit, upon application of heat thereto to escape into the outer atmosphere, thermostatic means to open said second door and simultaneously effect the closing of the door between the chambers, said thermostatic means being heated simultaneously with the energizing of the heating element, and means for de-energizing said heating element when a desired weight of water has been removed from the adsorbing unit.

2. A drying apparatus comprising the combination of a drying chamber adapted to receive materials to be dried and an adsorbing chamber, said chambers having a common wall, a movable door in the wall, a moisture adsorbing unit within the adsorbing chamber comprising a plurality of spaced moisture-adsorbing plates having electrical resistance wires forming heating means embedded therein, means for movably supporting said adsorbing unit, and means actuated by said supporting means when a predetermined weight of moisture has been adsorbed by said unit to energize said resistance wires, a second door separating the adsorbing chamber from the outer atmosphere, located approximately over the adsorbing unit whereby vapors liberated from the adsorbing unit, upon application of heat thereto, esscape by convection into the outer atmosphere, thermostatic means to open said second door and simultaneously effect the closing of the door between the chambers, said thermostatic means comprising a bimetallic strip having an independent heating element in association therewith and being energized simultaneously with the energizing of the resistance wires of the adsorbing unit and means for de-energizing said resistance wires when a desired weight of water has been removed from the adsorbing unit.

3. A drying apparatus comprising the combination of a drying chamber, adapted to receive materials to be dried, an adsorbing chamber in close proximity thereto and in communication therewith, a movable door between the said chambers, a movably supported moisture-adsorbing unit, a counterbalancing means comprising an adjustable spring adapted to hold said adsorbing unit in a predetermined position when freed from moisture yet allow said unit to move downward as it adsorbs moisture, the spring being adapted to restore the moisture adsorbing unit to the position occupied by it before adsorption of water when adsorbed water is removed, heating means for said moisture adsorbing unit, means to energize said heating means actuated by the counterbalancing means upon the downward movement of the moisture adsorbing unit after adsorbing a desired amount of water, means to close the door between the adsorbing chamber and the drying chamber and simultaneously open a second door separating the adsorbing chamber from the outer atmosphere whereby the vapors liberated from the adsorbing unit, on application of heat thereto, can escape into the outer atmosphere by convection, said door-operative means comprising a bimetallic strip having independent heating means energized simultaneously with the heating means for the heating means of said adsorbing unit and means to de-energize both heating means when a desired amount of water has been removed from said adsorbing unit.

4. A drying apparatus comprising the combination of a drying chamber to receive materials to be dried, an adsorbing chamber in close proximity thereto, a moisture adsorbing unit in said adsorbing chamber with heating means, a movable door between the drying chamber and the adsorbing chamber, a second door separating the adsorbing chamber from the outer atmosphere, means adapted to instantaneously close the said first door upon the incipient opening of the second door thereby permitting vapors liberated from the adsorbing unit to escape into the outer atmosphere, said second door being interconnected with the first door through the instrumentality of a link supporting a pawl provided with a finger adapted to release a latch attached to the first door from the said pawl engaging it when the finger of said pawl is seized during its downward travel by a swinging hook pivoted on the side of the adsorbing chamber, a bi-metallic strip having an independent heating element in association therewith, being energized simultaneously with the energizing of the heating means for said adsorbing unit, a link connecting the bimetallic strip and said second door whereby said door is opened when the bimetallic strip is bent upon being heated and means for de-energizing said heating means when a desired amount of moisture has been removed from said moisture adsorbing unit.

RALPH V. HEUSER.